US009983621B1

(12) United States Patent
Menon et al.

(10) Patent No.: US 9,983,621 B1
(45) Date of Patent: May 29, 2018

(54) ELECTRONIC DEVICE POWER STORAGE UNIT CONFIGURATIONS

(71) Applicant: Amazon Technologies, Inc., Seattle, WA (US)

(72) Inventors: Anoop Menon, Capitola, CA (US); James Robert Lim, San Jose, CA (US); Yuting Yeh, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 62 days.

(21) Appl. No.: 14/946,307

(22) Filed: Nov. 19, 2015

(51) Int. Cl.
  *G06F 1/16* (2006.01)
(52) U.S. Cl.
  CPC .................. *G06F 1/1626* (2013.01)
(58) Field of Classification Search
  CPC .................................................. H01M 2/0287
  USPC ..................................................... 361/679.27
  See application file for complete search history.

(56) References Cited

U.S. PATENT DOCUMENTS

| 2,826,626 | A | * | 3/1958 | Bryant | .................... | H01M 6/48 |
| | | | | | | 429/118 |
| 2008/0299391 | A1 | * | 12/2008 | White | ..................... | B01J 13/14 |
| | | | | | | 428/402.21 |
| 2014/0002419 | A1 | * | 1/2014 | Thorson | .................. | G06F 3/147 |
| | | | | | | 345/175 |
| 2014/0267949 | A1 | | 9/2014 | Kim et al. | | |

* cited by examiner

*Primary Examiner* — Jerry Wu
(74) *Attorney, Agent, or Firm* — Lee & Hayes, PLLC

(57) ABSTRACT

A power storage unit (e.g., a battery) may replace the structural components that support the display of an electronic device. The power storage unit may be adhered to the back surface of the display to provide structural support and to allow for bend or flex of the display. A self-healing layer may prevent or inhibit leaking of materials from within the power storage unit if the power storage unit is cracked or pierced. Alternatively, the power storage unit may be built on a flexible circuit that is associated with the display of the electronic device, where the flexible circuit/power storage unit may be folded around the display and affixed to the back surface of the display. The power storage unit may also be built on substrate associated with the back surface of the display. These configurations may cause a significant reduction in the depth or thickness of the electronic device.

20 Claims, 7 Drawing Sheets

ELECTRONIC DEVICE POWER STORAGE UNIT CONFIGURATIONS

BACKGROUND

Many users enjoy entertainment through the consumption of digital content, such as music, movies, images, electronic books, and so on. These users employ various electronic devices to consume (e.g., read or otherwise view) such content. Among these electronic devices are electronic book (eBook) reader devices, cellular telephones, personal digital assistants (PDAs), portable media players, tablet computers, and the like. Typically, at least one power storage unit, such as a battery, is needed to power the electronic device, and thereby allow a user to read a book, watch a video, and so on. However, a relatively large power storage unit may enable the user to consume content for longer periods of time, but may be bulky, thus negatively affecting the look and feel of the electronic device. On the other hand, a relatively small power storage unit may allow for a smaller/thinner device, but may not provide sufficient power to allow the user to consume content for longer periods of time.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1A:
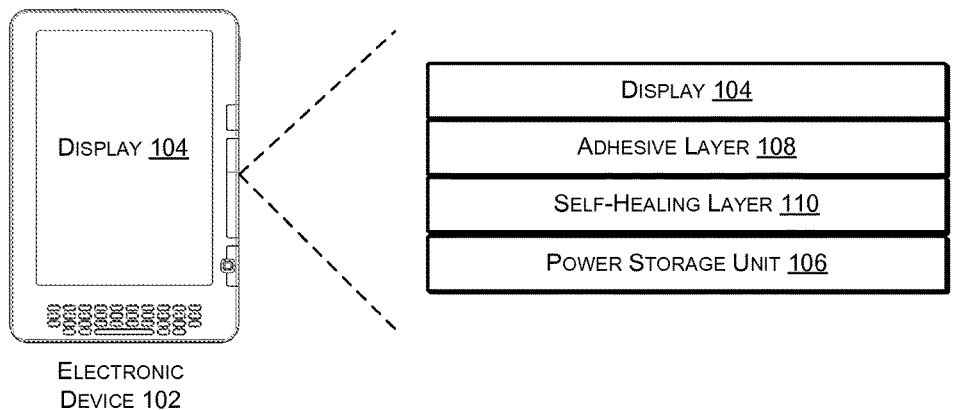
FIGS. 1*a*, 1*b*, and 1*c* illustrate example electronic devices having different power unit storage configurations.

This disclosure describes, in part, multiple configurations for power storage units in electronic devices. Typically, power storage units, such as a battery, store and provide power that is used to operate an electronic device. However, power storage units that are capable of providing power to the electronic device for extended periods of time can be bulky, and may interfere with the look and feel of the electronic device.

Accordingly, in one embodiment, the systems and processes described herein utilize the power storage unit as a supporting structure for the display of the electronic device. More particularly, the power storage unit may replace structural components of the electronic device, such as a midframe, that provide rigidness for the display, but also allow for flex/bend of the display. Provided that the front surface of the display presents content to the user, the power storage unit may be affixed or adhered to the back surface of the display using an adhesive layer, such as a pressure-sensitive adhesive (PSA), for example. Since the power storage unit may replace structural components of the electronic device that support the display, the power storage unit may still power the electronic device, but the depth and/or width of the electronic device may be reduced.

In another embodiment, the power storage unit of the electronic device may be built on, or incorporated within, a flexible printed circuit (FPC) of the electronic device. Typically, the display of the electronic device has an FPC (also referred to as a display FPC) that facilitates a connection between the display and the motherboard (or mainboard, system board, planar board, or logic board) of the electronic device. Since adding the power storage unit to the FPC elongates or enlarges the FPC, the resulting FPC/power storage unit structure may be folded behind the display such that the FPC/power storage unit structure is affixed to the back surface of the display. This may result in a reduced depth/width of the electronic device, while the FPC/power storage unit structure may still provide sufficient power to the electronic device to allow for the electronic device to be used in its intended manner (e.g., consume content, etc.).

In an additional embodiment, a power storage unit may be built onto a back surface of a display of an electronic device. For instance, the power storage unit may be built on a glass or silicon substrate on the back surface of the display, which may reduce the depth or thickness of the electronic device. In certain embodiments, the power storage unit may contain multiple layers, such as one or more current collectors, a cathode material, a solid electrolyte, an anode material, and one or more protective or coating layers that protect the contents of the power storage unit.

In any of the embodiments described above, the power storage unit may contain a self-healing layer. As will be described in additional detail herein, the display and/or power storage unit of the electronic device may break or crack in certain situations, such as the electronic device being dropped by the user. The self-healing layer may be proximate to at least one surface of the power storage unit, and may prevent or inhibit the power storage unit from being pierced or otherwise damaged, such as by preventing cracks from propagating throughout the surface of the power storage unit. When activated, material (e.g., polymers) within the self-healing layer may fill cracks, punctures, or other voids in the surface of the power storage unit so that further cracking is prevented. The material may be oxygen, moisture, and/or light sensitive, such that when the material is exposed to oxygen, moisture, or light, the material is activated and flows into the damaged areas of the surface of the power storage unit. This may prevent the leakage of harmful or destructive material from within the power storage unit.

The techniques described herein may be implemented in a variety of ways and by a variety of electronic devices. While a few examples are illustrated and described below, it is to be appreciated that other electronic devices may implement these techniques.

Figure 1B:
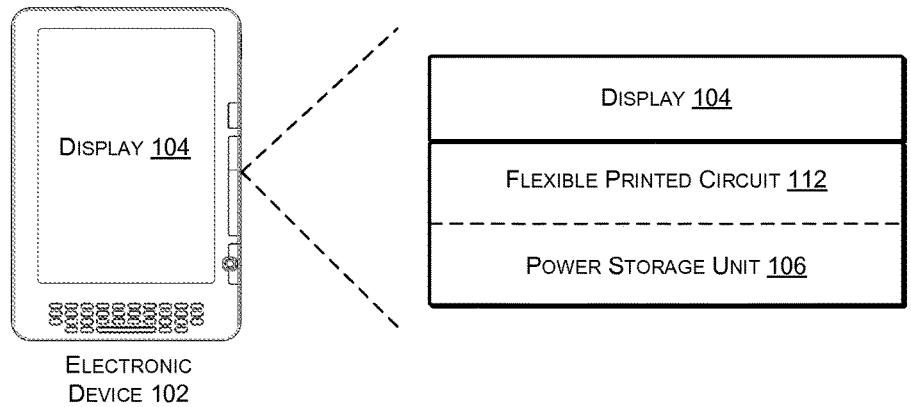
Figure 1C:
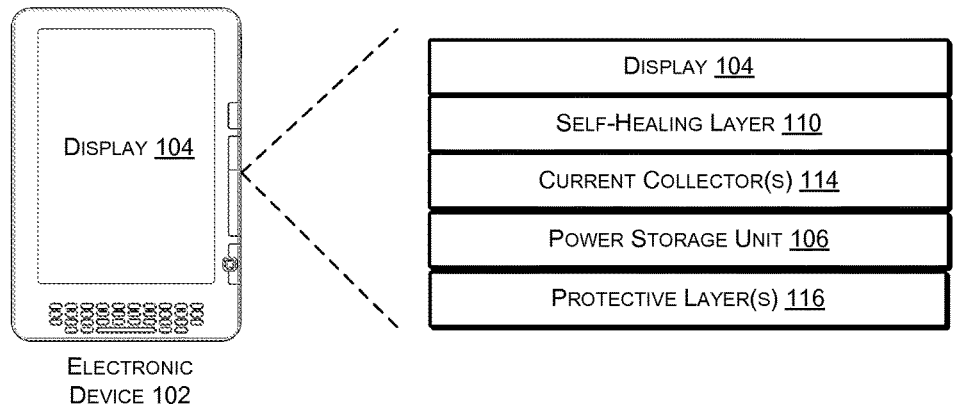

FIGS. 1*a*, 1*b*, and 1*c* each illustrate an example system that includes an electronic device 102, a display 104 for presenting content items (e.g., electronic books (eBooks), video, video games, etc.), and various configurations of a power storage unit 106 that is included within the electronic device 102. The illustrative examples depicted in FIGS. 1a-1c may reduce the depth or thickness of the electronic device 102, while also being able to store and supply a sufficient amount of power to enable a user to operate the electronic device 102 in its intended manner.

As shown in FIG. 1a, the electronic device 102 may include a display 104 that presents a content item to a user operating the electronic device 102. The user of the electronic device 102 may interact with the electronic device 102 (e.g., an eBook reader device) for the purpose of consuming (e.g., reading) the content item (e.g., an eBook). For instance, the user may perform some action (e.g., pressing a button, interacting with a touch-sensitive interface, uttering a voice command, etc.) to update or turn the page of the content item. In other embodiments, the user may take some action to cause a video to be presented, paused, fast-forwarded, and so on. Unless the electronic device 102 is connected to a power source (e.g., plugged into an outlet), in order for the electronic device 102 to present the content item, the electronic device 102 may have one or more power storage units 106 that store and provide power to the electronic device 102. For the purposes of this discussion, the power storage unit 106 may include any type of battery or other storage mechanism that provides power to the electronic device 102, which are described in additional detail below. The power storage unit 106 may enable a user of the electronic device 102 to cause the electronic device 102 to perform operations, actions, etc., that the electronic device 102 is intended to perform.

A battery may be referred to as a device having two or more electrochemical cells that convert stored chemical energy into electrical energy. The resulting electrical energy may be utilized to power the electronic device 102. In some scenarios, each of the electrochemical cells may include a positive terminal (e.g., a cathode) and a negative terminal (e.g., an anode). The positive terminal is at a higher electrical potential energy as compared to the negative terminal. Moreover, the positive terminal is the source of electrons that, when connected to an external circuit, will flow and deliver energy/power to the electronic device 102. A battery may be considered rechargeable or not. Rechargeable batteries (e.g., lithium-ion batteries, lead-acid batteries, etc.) can be discharged and recharged multiple times, whereas non-rechargeable (e.g., disposable) batteries are used a single time and then discarded.

As shown in FIG. 1a, the electronic device 102 may include the display 104, the power storage unit 106, an adhesive layer 108 and a self-healing layer 110. In various embodiments, the display 104 may include multiple different surfaces, such as a front surface in which content is presented/displayed to the user, a back surface that resides within the interior of the electronic device 102, and/or one or more side surfaces. In various embodiments, the power storage unit 106 of the electronic device 102 may be attached or affixed to the back surface of the display 104 using the adhesive layer 108. The adhesive layer 108 may be any type of material that causes the power storage unit 106 to be affixed or adhered to the back surface of the display 104. For instance, the adhesive layer 108 may be a pressure-sensitive adhesive (PSA) or a double-sided PSA that is placed on the back surface of the display 104 and/or the power storage unit 106.

Typically, the display 104 of the electronic device 102 is adhered to some structural component, such as a mid-frame, where the mid-frame may correspond to a rigid (and possibly metal) plate or sheet. The purpose of the structural component is to provide support and structure to the display 104. However, in this embodiment, the power storage unit 106 may replace some or all of the structural component. More particularly, provided that the power storage unit 106 has mechanical properties (e.g., strength, ductility, hardness, impact resistance, fracture toughness, plasticity, creep, etc.) similar to that of the structural component, the power storage unit 106 may be adhered directly to the back surface of the display 104 via the adhesive layer 108. The power storage unit 106 may serve as the structural component to support the display 104. That is, the power storage unit 106 may have sufficient rigidness to support the display 104, while also providing enough flexibility to accommodate for any necessary flexing or bending of the display 104. In some embodiments, the rigidness of the power storage unit 106 may have to be greater than or less than one or more thresholds (e.g., a stiffness threshold, a bendability threshold, etc.) in order to serve as the structural component for the display 104. As a result, by replacing the structural component of the electronic device 102 with the power storage unit 106, the thickness or depth of the entire electronic device 102 may be significantly reduced.

The electronic device 102 may also include a self-healing layer 110 that is proximate or adjacent to one or more surfaces of the power storage unit 106. For the purposes of this discussion, the self-healing layer 110 may be any type of material that prevents or inhibits the contents within the power storage unit 106 from leaking from within the power storage unit 106 into the interior and/or the exterior of the electronic device 102. As will be discussed in additional detail with respect to FIGS. 2 and 3, upon a surface of the power storage unit 106 becoming pierced or cracked, the self-healing layer 110 may fill any cracks/piercings such that the contents of the power storage unit 106 does not leak from the interior of the power storage unit 106.

FIG. 1b illustrates an electronic device 102 having a display 104, a power storage unit 106 and a flexible printed circuit (FPC) 112. For the purposes of this discussion, the FPC 112 may be any type of flexible circuit (also referred to herein as "flex circuit"), which may correspond to technology for assembling electronic circuits by mounting at least portions of electronic devices on flexible plastic substrates (e.g., polyimide, polyether ether ketone (PEEK), transparent conductive polyester film, etc.). Flex circuits may be used for rigid printed circuit boards, which allow the board to conform to a desired shape, or to flex during use. Moreover, many types of materials may be used as a substrate for the flex circuit, such as glass, silicon, plastic, metal foil, and so on. The flex circuit may serve as a passive wiring structure that is used to interconnect electronic components of the electronic device 102, such as integrated circuits, resistor, and/or capacitors. However, some flex circuits are used for making interconnections between other electronic assemblies either directly or by means of connectors. Examples of flex circuits may include single-sided flex circuits, double access (or back bared) flex circuits, sculptured flex circuits, double-sided flex circuits, multilayer flex circuits, rigid-flex circuits, and polymer thick film flex circuits, to name a few.

As shown in FIG. 1b, the FPC 112 may be modified to include the power storage unit 106, or the FPC 112 may be the power storage unit 106 itself. Since the FPC 112 may be included in the electronic device 102 regardless of the power storage unit 106 configuration of the electronic device 102, incorporating the power storage unit 106 into the FPC 112 may reduce the overall depth or thickness of the electronic device 102. Moreover, the resulting FPC/power storage unit structure may be folded underneath the display 104 such that the FPC/power storage unit structure is affixed to the back surface of the display 104. The configuration illustrated in FIG. 1b is described in additional detail with respect to FIGS. 4 and 5.

Moreover, FIG. 1c illustrates an electronic device 102 having a display 104 and a power storage unit 106 built on the back surface of the display 104. In particular, one or more current collector(s) 114 may be affixed to the back surface of the display 104. As mentioned above, the self-healing layer 110, and/or some other protective layer that protects the power storage unit 106, may be included within the back surface of the display 104, may be a coating that covers one or more surfaces of the power storage unit 106, or may be adjacent to the back surface of the display 104. Proximate to the current collector(s) 114 may be the remainder of the power storage unit 106. Moreover, one or more protective layers 116 may encapsulate the power storage unit 106 to help prevent the power storage unit 106 from being damaged (e.g., cracked, pierced, etc.). In this embodiment, the power storage unit 106 may be built or situated directly on the back surface of the display 104, which may include a glass or silicon substrate. Since the power storage unit 106 is built on a substrate associated with the back surface of the display 104, the overall thickness or depth of the electronic device 102 may be significantly reduced. The configuration illustrated in FIG. 1c is described in additional detail with respect to FIG. 6.

Figure 2:
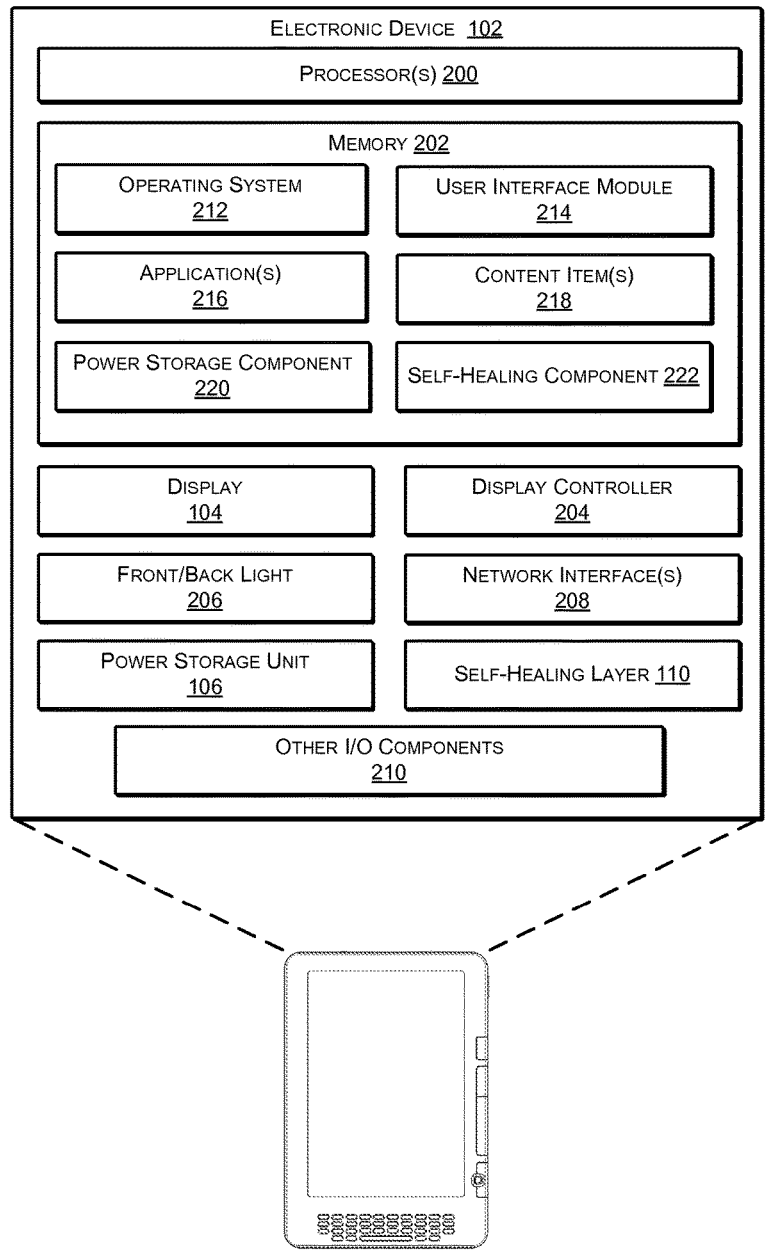
FIG. 2 illustrates example components of an electronic device having at least one power storage unit that causes the electronic device to have a reduced thickness.

FIG. 2 illustrates example components of an electronic device, such as electronic device 102, that is configured to present content to a user. While FIG. 2 illustrates the electronic device 102 as a dedicated eBook reading device, in other implementations, the electronic device 102 may include any other type of mobile electronic device (e.g., a laptop computer, a tablet computing device, a multifunction communication device, a portable digital assistant (PDA), etc.) or non-mobile electronic device (e.g., a desktop computer, a television, a game console, etc.).

Regardless of the specific implementation of the electronic device 102, the electronic device 102 may include one or more processors 200, memory 202, a display 104, a display controller 204, a front/back light 206, network interface(s) 208, a power storage unit 106, a self-healing layer 110, and other I/O components 210. Moreover, the memory 202 of the electronic device 102 may include an operating system 212, a user interface module 214, one or more applications 216, content items 218, a power storage component 220, and a self-healing component 222. Various components associated with the electronic device 102 may also be referred to as modules, and vice versa. Moreover, one or more of the components of the electronic device 102 (e.g., the processors 200, memory 202, etc.) may be contained within a housing of the electronic device 102.

In various embodiments, the processor(s) 200 may execute one or more modules and/or processes to cause the electronic device 102 to perform a variety of functions, as set forth above and explained in further detail in the following disclosure. In some embodiments, the processor(s) 200 may include a central processing unit (CPU), a graphics processing unit (GPU), both CPU and GPU, or other processing units or components known in the art. Additionally, each of the processor(s) 200 may possess its own local memory, which also may store program modules, program data, and/or one or more operating systems. The processor 200 may include multiple processors 200 and/or a single processor 200 having multiple cores.

The memory 202 may include computer-readable storage media ("CRSM"), which may be any available physical media accessible by the processor(s) 200 to execute instructions stored on the memory 202. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor(s) 200.

In some instances, the display 104 may represent a type of reflective display, such as an electronic paper display, that displays content based on light reflected from above the display 104. Electronic paper displays may represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display 104.

In one implementation, the display 104 may include an electrophoretic display that moves particles between different positions to achieve different color shades. For instance, in a pixel that is free from a color filter, the pixel may be configured to produce white when the particles within this pixel are located at the front (i.e., viewing) side of the display 104. When situated in this manner, the particles reflect incident light, thus giving the appearance of a white pixel. Conversely, when the particles are pushed near the rear of the display 104, the particles absorb the incident light and, hence, cause the pixel to appear black to a viewing user. In addition, the particle may situate at varying locations between the front and rear sides of the display 104 to produce varying shades of grey. Furthermore, as used herein, a "white" pixel may comprise any shade of white or off white.

In another implementation, the display 104 may include an electrophoretic display that includes oppositely charged light and dark particles. In order to create white, the display controller 204 may move the light particles to the front side of the display 104 by applying a voltage to create a corresponding charge at an electrode near the front and moves the dark particles to the back of the display 104 by creating a corresponding charge at an electrode near the back. In order to create black, meanwhile, the display controller 204 may change the polarities and move the dark particles to the front and the light particles to the back. Furthermore, to create varying shades of grey, the display controller 204 may utilize different arrays of both light and dark particles.

In still another implementation, the display 104 may include an electrowetting display that employs an applied voltage to change the surface tension of a liquid in relation to a surface. For instance, by applying a voltage to a hydrophobic surface, the wetting properties of the surface can be modified so that the surface becomes increasingly hydrophilic. As one example of an electrowetting display, the modification of the surface tension may act as an optical switch by contracting a colored oil film when a voltage is applied to individual pixels of the display 104. When the voltage is absent, the colored oil may form a continuous film within a pixel, and the color may thus be visible to a user of the display 104. On the other hand, when the voltage is applied to the pixel, the colored oil may be displaced and the pixel may become transparent. When multiple pixels of the display 104 are independently activated, the display 104 may present a color or greyscale image. The pixels may form the basis for a transmissive, reflective, or transmissive/reflective (transreflective) display 104. Further, the pixels may be responsive to high switching speeds (e.g., on the order of several milliseconds), while employing small pixel dimensions. Accordingly, the electrowetting displays herein may be suitable for applications such as displaying video content. In addition, the lower power consumption of electrowetting displays in comparison to conventional liquid-crystal displays (LCDs) makes the technology suitable for displaying content on portable devices that rely on battery power.

Of course, while multiple different examples have been given, it is to be appreciated that the displays 104 described herein may comprise any other type of electronic paper technology, such as gyricon displays, electrowetting displays, electrofluidic displays, interferometric modulator displays, cholestric liquid crystal displays, and the like. In addition, while some of the displays 104 described below are discussed as displaying dark (e.g., black), light (e.g., white), and varying shades of grey, it is to be appreciated that the described techniques apply equally to electronic paper displays capable of displaying color pixels.

Furthermore, while the techniques above describe the use of reflective displays and front lights, in some instances the techniques described herein may be used in backlit displays. For instance, the brightness of a backlight in a display may be altered in the same, similar or different ways as described herein with reference to a page-update on a reflective display.

Moreover, the display controller 204 may control the updating of the display 104, as well as controlling a front/back light 206 of the electronic device 102. The front light 206 may be integrated within the electronic device 102. In these instances, one or more light sources (e.g., light emitting diodes LEDs) may reside around some or all of the display 104, and may be illuminated when desired. A surface of the display 104 may include diffractive gratings (e.g., having a sawtooth cross-sectional profile) that diffracts light received across the surface of the display 104 down onto the display 104. The display 104 may then reflect the light back upwards and away from the display 104, thus illuminating the display 104. In other instances, the front light may detachably couple to the electronic device 102. Of course, while two examples are described herein, electronic devices may implement any other types of lights configured to light a front portion of the display 104 of the electronic device 102.

FIG. 2 further illustrates that the electronic device 102 may include one or more network interfaces 208, one or more power storage units 106 that store and provide power to the electronic device 102, a self-healing layer 110, and one or more other input/output components 210. The network interfaces 208 may support both wired and wireless connection to various networks, such as cellular networks, radio, WiFi networks, short range networks (e.g., Bluetooth), IR, and so forth.

As illustrated, the memory 202 may further store an operating system 212, a user interface module 214, one or more applications 216, and one or more content items 218. In some instances, the one or more of the applications 216 may include content presentation applications for presenting the content items 218. For instance, an application 216 may be an eBook reader application for rending textual electronic books, an audio player for playing audio books or songs, a video player for playing video, and so forth. Moreover, the content items 218 may include any type of content, such as eBooks, audio books, songs, videos, still images, and the like.

The memory 202 further stores a power storage component 220 and a self-healing component 222. In various embodiments, the power storage component 220 may monitor, control, and/or regulate the amount of power stored by the power storage unit 106 and/or provided by the power storage unit 106 to the electronic device 102. Moreover, the self-healing component 222 may monitor, control, and/or regulate the extent to which the self-healing layer 110 inhibits or prevents damage to the power storage unit 106, as will be discussed in additional detail with respect to FIG. 3.

In some instances, the electronic device 102 may have features or functionality in addition to those that FIG. 2 illustrates. For example, the electronic device 102 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the electronic device 102 may reside remotely from the electronic device 102 in some implementations. In these implementations, the electronic device 102 may utilize the network interfaces 208 to communicate with and utilize this functionality.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Figure 3:
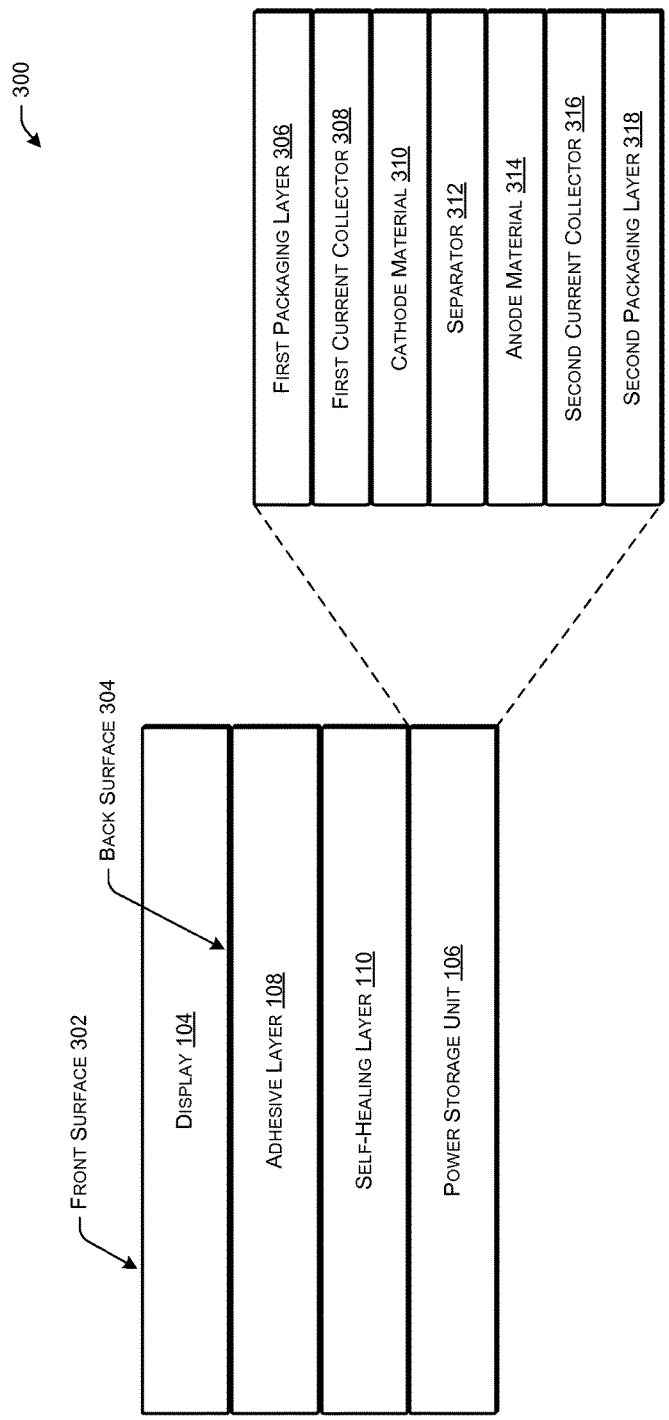
FIG. 3 illustrates an example configuration of a power storage unit that is adhered to a back surface of a display of an electronic device using an adhesive layer.

FIG. 3 illustrates a diagram 300 that corresponds to the electronic device 102 configuration illustrated in FIG. 1a. As shown, the electronic device 102 may include a display 104, a power storage unit 106, an adhesive layer 108, and a self-healing layer 110. In various embodiments, the display 104 may have a first surface, such as a front surface 302, that presents content for consumption by a user that is operating the electronic device 102. The display 104 may also include a second surface, such as a back surface 304, that is opposite of the front surface 302 and that resides within the interior of the electronic device 102. The power storage unit 106 may be affixed, attached, or adhered to the back surface 304 of the display 104 by the adhesive layer 108. Moreover, the self-healing layer 110 may inhibit or prevent materials within the power storage unit 106 from leaking, such as by filling voids, cracks, and/or punctures in the surface of the power storage unit 106.

As described above, the power storage unit 106 may replace certain structural components (e.g., a mid-frame) that are typically present in electronic devices 102. Such structural components tend to be located proximate to the back surface 304 of the display 104 and serve as structural support for the display 104. Provided that the power storage unit 106 possesses mechanical properties that are similar to that of the structural components that the power storage unit 106 is replacing, the power storage unit 106 may provide sufficient structural support for the display 104, as well as being able to accommodate for any flex or bend of the display 104. Replacing the structural components with the power storage unit 106 may significantly reduce the thickness or depth of the electronic device 102.

In various embodiments, the adhesive layer 108 may be any type of material that permanently or detachably attaches the power storage unit 106 to the back surface 304 of the display 104. For instance, the adhesive layer 108 may include a pressure-sensitive adhesive (PSA), which may also be referred to as a self-adhesive or a self-stick adhesive. The PSA forms a bond when pressure is applied to attach the adhesive (e.g., the adhesive layer 108) with the material to be adhered (e.g., the back surface 304 of the display 104 and/or a surface of the power storage unit 106). To adhere the power-storage unit 106 to the display 104, the PSA may be applied to the back surface 304 of the display 104 and/or a surface of the power storage unit 106. In certain embodiments, solvents, water, and/or heat may or may not be needed to activate the PSA. Moreover, the degree or strength of the bond may be based at least partly on the amount of pressure that is used to apply the adhesive to the surface. Moreover, factors such as the smoothness, surface energy, the removal of contaminants, etc., may affect the degree or strength of the bond. In other embodiments, the adhesive layer 108 may include structural adhesives. To form a permanent bond, structural adhesives harden via processes such as evaporation of a solvent (e.g., white glue), reaction with UV radiation, chemical reactions (e.g., a two-part epoxy), and/or cooling (e.g., a hot melt).

As shown in FIG. 3, the power storage unit 106 may include multiple different components, which may be arranged or configured in a particular order or multiple different orders. In particular, the power storage unit 106 may include a first packaging layer 306, a first current collector 308, cathode material 310, a separator 312, anode material 314, a second current collector 316, and a second packaging layer 318. Although multiple components of the power storage unit 106 are illustrated in FIG. 3, some, none, or all of the components may be included within the power storage unit 106.

The first packaging layer 306 may encapsulate one or more surfaces (e.g., the first surface 302, the back surface 304, a side surface, etc.) of the power storage unit 106 and may serve to protect the power storage unit 106 from damage. The first packaging layer 306 may include a self-adhesion layer, glass, a parylene, a polymer coating, an epoxy, a laminate coating, or any other material that protects the surfaces of the power storage unit 106. The first packaging layer 306 may also be hermetic in nature, meaning that the first packing layer 306 may be airtight and prevent the flow of moisture and/or air into and/or out of the power storage unit 106. Moreover, the second packaging layer 318 may be similar to, or different from, the first packing layer 306. For instance, the second packaging layer 318 may be an additional protective layer that protects the power storage unit 106 from damage, or may be a protective layer that is proximate to other surfaces of the power storage unit 106.

The first current collector 308 and/or the second current collector 316 may be any type of metal that serves to facilitate the passing of electronic current to and from the cathode material 310 and/or the anode material 314. For instance, the first current collector 308 and the second current collector 310 may include a copper layer, a nickel layer, a platinum layer, and so on. The first current collector 308 may facilitate the passing of electronic current with respect to the cathode material 310 and the second current collector 316 may facilitate the passing of electrical current with respect to the anode material 314.

In various embodiments, the cathode material 310 and the anode material 314 are each an electrode from which electronic current leaves or enters a polarized electrical device, such as the power storage unit 106. Accordingly, one of the cathode material 310 or the anode material 314 may be positively charged, and the other one of the cathode material 310 or the anode material 314 will be negatively charged.

In various embodiments, a separator 312 may be positioned between the cathode material 310 and the anode material 314, and may prevent electrical current (e.g., electrons) from flowing freely between the cathode material 310 and the anode material 314. In various embodiments, the separator 312 may be an electrolyte (e.g., a solid electrolyte, a liquid electrolyte, etc.) that prevents electrons from moving directly between the cathode material 310 and the anode material 314 within the power storage unit 106.

In additional embodiments, the self-healing layer 110 may be proximate to one or more surfaces of the power storage unit 106. For the purposes of this discussion, the self-healing layer 110 may include any material, compound, polymer, or substance (hereinafter referred to as "self-healing polymers") that prevents or repairs puncturing or cracking of the power storage unit 106, such as by filling up any mechanical damage to the power storage unit 106. As a result, by preventing or repairing puncturing/cracking of a surface of the power storage unit 106, or by filling voids in the surface of the power storage unit 106, the self-healing layer 110 may prevent harm or damage to the electronic device 102 and/or a user operating the electronic device 102. Since the power storage unit 106 may include chemicals that could potentially be flammable, corrosive, etc. (e.g., lithium-ion batteries), the self-healing layer 110 may reduce the likelihood that damage to the power storage unit 106 will harm a user operating the electronic device 102.

For the purposes of this discussion, the self-healing layer 110 may include one or more materials or polymers (i.e., self-healing polymers) that have the structurally incorporated ability to repair damage to one or more surfaces of the power storage unit 106. Typically, cracks or punctures to the power storage unit 106, and particularly small cracks or punctures, may go unnoticed, and may be difficult to repair since the electronic device 102 may not be configured to allow a user to disassemble the electronic device 102, and to identify and mend the crack/puncture. By incorporating the self-healing layer 110 proximate to one or more surfaces of the power storage unit 110, damage experienced by the power storage unit 110 may be repaired without user intervention. Instead of, or in addition to, actually repairing such damage to the surface of the power storage unit 106, the self-healing layer 110 may also stop further damage to the power storage unit 106, such as preventing a crack in the surface of the power storage unit 106 to further propagate throughout the surface of the power storage unit 106.

In certain embodiments, the display 104 of the electronic device 102 may comprise glass or some other breakable material. Accordingly, as a result of the electronic device 102 being misused or dropped, for example, the display 104 may break or shatter. Provided that the power storage unit 106 is adhered to the back surface of the display 104, broken pieces of the display 104 could conceivably crack or puncture a surface of the power storage unit 106, which may allow harmful chemicals to leak from the power storage unit 106. If it is determined that a surface of the power storage unit 106 has been cracked or punctured, the materials or polymers included in the self-healing layer 110 (i.e., the self-healing polymer(s)) may flow into the crack/puncture, thereby filling the crack/puncture, and preventing the crack/puncture to propagate throughout the surface of the power storage unit 106.

The self-healing layer 110 may be proximate to one, some, or all surfaces of the power storage unit 106. For instance, the self-healing layer 110 may be adjacent or proximate to the surface of the power storage unit 106 that is adhered to the back surface 304 of the display 104. The self-healing layer 110 may be situated in that location since the surface of the power storage unit 106 that is adjacent to the back surface 304 of the display 104 is most likely to be punctured or cracked in response to the display 104 becoming broken. Further, the adhesive layer 108 that bonds the back surface 304 of the display 104 to the power storage unit 106 may itself be the self-healing layer 110.

Certain polymers, which may make up the surface of the power storage unit 106 (hereinafter referred to as "surface polymers"), may react to physical stress in different ways. Upon experiencing mechanical stress, varying temperatures, etc., bonds within and between molecules of a surface polymer may be cleaved or broken, possibly resulting in the surface polymer being weakened. For instance, when the electronic device is dropped or mishandled, the bonds between and within molecules of a surface polymer that at least partially makes up the surface of the power storage unit 106 may be cleaved/broken, which may result in a weakening of the surface (e.g., a crack or a puncture). Provided that the surface polymers are intrinsic to, and are included within, the surface of the power storage unit 106, such surface polymers may be reversible in nature, meaning that they can cause the cleaved/broken bonds to revert back to their initial state (e.g., the molecules being bonded to one another). Examples of the surface polymers and the self-healing polymers that may be included in the self-healing layer 110 may include polymers included in Diels-Alder and/or retro-Diels-Alder reactions, cross-linked polymers (e.g., reversible cross-linking of modified poly(N-acetylethyleneimine)s containing either maleimide or furancarbonyl pendant moideties), thiol-based polymers, poly(urea-urethane), and so on.

In some embodiments, the self-healing layer 110 may include materials, polymers, etc. (e.g., self-healing polymers) that are oxygen sensitive, moisture sensitive, temperature sensitive, and/or light sensitive. That is, the materials/polymers become activated when exposed to air, moisture (e.g., water), a certain temperature (or temperature range), or light. In some embodiments, the self-healing polymers may initially be in a solid state, and may be included in capsules, capillaries, channels, etc., included in the self-healing layer 110. When activated by air, moisture, light, etc., the materials/chemicals may undergo a chemical reaction, which may convert the materials/chemicals from a solid into a liquid that is able to fill a crack or puncture on the surface of the power storage unit 106. Provided that the self-healing polymers are included in capsules, capillaries, and/or channels, the self-healing polymers may be exposed to air, moisture, a particular temperature, light, etc., upon the capsules, capillaries, and/or channels rupturing. As a result of filling the crack/puncture, the self-healing layer 110 may prevent the contents of the power storage unit 106 from leaking into and/or out of the electronic device 102. That is, the polymers within the self-healing layer 110 may fill a void, crack, or puncture in the surface of the power storage unit 106 prior to potentially harmful chemicals leaking from the power storage unit 106. In additional embodiments, and as noted above, capsule-based polymers may sequester the self-healing polymers/chemicals in capsules that release the self-healing polymers/chemicals if the capsules are ruptured. For instance, the self-healing layer 110 may include one or more capsules, reservoirs, or pouches, which may be made of wax or other materials, that contain the self-healing polymers/chemicals that fill cracks or punctures in the surface(s) of the power storage unit 106. When the electronic device 102 is being operated in its intended manner (e.g., a user reading an eBook), the capsules/reservoirs/pouches may remain intact and the self-healing polymers/chemicals may remain within the capsules/reservoirs/pouches. However, if one or more of the capsules/reservoirs/pouches are broken or punctured (e.g., an opening occurs within the membrane of the capsules/reservoirs/pouches), the self-healing polymers/chemicals within the punctured capsule/reservoir/pouch are released. The self-healing polymers/chemicals may then flow into cracks or punctures in the surface of the power storage unit 106, if any. In some embodiments, the self-healing polymers/chemicals may first polymerize and then subsequently mend/repair the crack or puncture.

The capsules/reservoirs/pouches may be punctured in different manners. For instance, the capsules/reservoirs/pouches may rupture in response to physical stress experienced by the electronic device 102, such as the electronic device 102 being dropped on the ground, or hit against another object. In some embodiments, the self-healing layer 110 may include components having sharp edges (e.g., glass, etc.) that could cause the capsules/reservoirs/pouches to rupture. In addition, in response to physical stress experienced by the electronic device 102, the display 104 may break or shatter, which may produce sharpened pieces of glass or plastic. The broken pieces of the display 104 may pierce one or more of the capsules/reservoirs/pouches, thus causing them to rupture.

In some instances, the power storage unit 106 may swell as a result of an internal malfunction associated with the power storage unit 106. Such swelling may cause one or more surfaces of the power storage unit 106 to experience stretching and/or stress. Since the capsules/reservoirs/pouches may be disposed adjacent to one or more of the surfaces of the power storage unit 106, such stretching/swelling of the surface(s) may cause the capsules/reservoirs/pouches to rupture, thereby releasing the polymer material within the capsules/reservoirs/pouches. In addition, one or more microelectromechanical systems (MEMs) strain gauges may be positioned within, on, or adjacent to the power storage unit to measure or detect the swelling/stretching of the power storage unit 106. In some embodiments, if the swelling/stretching of the surface of the power storage unit 106 is greater than a threshold, the MEMS strain gauge(s) may trigger rupture of the capsules/reservoirs/pouches.

In some embodiments, in addition the self-healing polymer/chemicals being included within the capsules of the self-healing layer 110, the self-healing layer 110 may also include a catalyst that can be included within the capsules and/or outside of the capsules. The catalyst may lower the energy barrier of a chemical reaction that causes the self-healing polymers/materials to polymerize without having to introduce external stimuli, such as heat, light, etc. An example of the self-healing polymers/chemicals may include dicyclopentadiene (DCPD) and an example of the catalyst may be Grubb's catalyst (benzylidene-bis(tricyclohexylphosphine)dichlororuthenium) or ruthenium. When a capsule including the self-healing polymer/chemical (e.g., DCPD) is ruptured, the self-healing polymer/chemical and the catalyst (e.g., Grubb's catalyst, ruthenium, etc.) may initiate a chemical reaction (e.g., ring opening metathesis polymerization (ROMP)). The polymer resulting from the chemical reaction may then mend or fill the crack/puncture in the surface of the power storage unit 106.

Moreover, the self-healing polymers/chemicals may be included within a connected vascular system that is included within the self-healing layer 110. The vascular system may sequester the self-healing polymers/chemicals in hollow channels (e.g., capillaries) that can be interconnected in one, two, or three dimensions. Upon one of the channels being ruptured or damaged, the self-healing polymers/chemicals are released from the channels/tubes and may repair damage (e.g., cracks, punctures, etc.) experienced by the surface of the power storage unit 106. In certain embodiments, the vascular network that was ruptured/damaged may be refilled by another channel that was not ruptured/damaged.

The self-healing layer 110 could also include multiple chemicals that, when mixed, initiate a chemical reaction, where the result of the chemical reaction is a fluid that is able to fill any cracks or punctures in the surface of the power storage unit 106. In particular, each of the multiple chemicals may be stored in separate reservoirs or pouches within the self-healing layer 110. When different reservoirs including both a first chemical and a second chemical are broken or punctured, the chemical reaction will commence.

Moreover, the self-healing layer 110 may be a coating that is adjacent to the surface(s) of the power storage unit 106, or may be incorporated into the surface(s) of the power storage unit 106. For instance, as a surface of the power-storage unit 106 experiences dents, cracks, or punctures as a result of some external force, such damage may disappear or recover due to the elasticity of the self-healing polymers/materials that are included in the self-healing layer 110. In particular, the self-healing polymers/materials may have a cross-linked structure that includes segments having different hardness levels/values. The segments having higher hardness levels/values and segments having lower hardness levels/values may be intermixed or alternated to provide an elastic effect. Accordingly, when the self-healing layer 110 that includes the self-healing polymers/chemicals experiences physical stress (e.g., the electronic device 102 being dropped or mishandled), the self-healing polymers/chemicals may absorb the external pressure, and any damaged segments may then be reconstructed and restored.

As stated above, the electronic device 102 may determine if and when the power storage unit 106 has been damaged, such as a surface of the power storage unit 106 being cracked or punctured. For instance, the electronic device 102 may determine a likelihood that the power storage unit 106 has been damaged based on a determination that the output voltage (e.g., a voltage value) associated with the power storage unit 106 has decreased, such as by decreasing at or below a threshold voltage value, or the output voltage of the power storage unit 106 being above or below a range of voltage values. In addition, the electronic device 102 may apply a pulse of current to the power storage unit 106, which may result in the electronic device 102 being able to determine an impedance value associated with the power storage unit 106. If the impedance value is above or below a threshold impedance value, or is outside a specific range of impedance values, then the electronic device 102 may determine that there is a short circuit associated with the power storage unit 106. If the output voltage value or the impedance value is outside a range of standard values, or is above or below a threshold value, the electronic device 102 may determine that the power storage unit 106 has experienced at least some damage (e.g., a crack, puncture, etc., in a surface of the power storage unit 106). Based on the degree in which the output voltage value or the impedance value is outside a range of values or is above/below a threshold value, the electronic device 102 may determine a likelihood value that the power storage unit 106 has been damaged. For instance, if the output voltage value is significantly lower than typical output voltage values, then the electronic device 102 may determine that there is a higher likelihood that the power storage unit 106 has experienced damage.

Accordingly, the self-healing layer 110 may include materials that exhibit the ability to repair breakage, cracks, and/or punctures in a surface. Moreover, depending on the structure and chemical composition of the materials, the repair process can occur either as a result of external stimuli (e.g., oxygen, moisture, light, etc.) or autonomously, and can be a one-time event or a repeatable process.

As discussed above, the power storage unit 106 may be a single unit that serves as structural support for the display 104 of the electronic device 102. However, in additional embodiments, multiple power storage units 106 may be adhered to the back surface 304 of the display 104 using the adhesive layer 108. The multiple power storage units 106 may be positioned in different locations along the back surface 304 of the display 104 to both provide structural support for the display 104, as well as to accommodate for additional flexibility and bendability of the display 104. The multiple power storage units 106 may also be connected to one another. Similarly, a single power storage unit 106 may be split into multiple segments that are connected in a series or in parallel. The power storage unit 106 having multiple segments may also allow for additional flex or bend of the display 104, while also providing sufficient structural support for the display 104.

As set forth above, the power storage unit 106 having two or more cells that are configured in a single unit that is adhered to the back surface 304 of the display 104. This configuration of the power storage unit 106 may power some or all components (e.g., the display 104) of the electronic device 102. In other embodiments, the power storage unit 106 may have multiple cells that collectively make up the poser storage unit 106 and that are separated/spaced from one another, but that are each still adhered to the back surface 304 of the display 104. As result, there may be portions of the display 104 in which there is no cell adhered thereto. In areas of the display 104 where a cell of the power storage unit 106 is adhered, the cell may provide structural support for the display 104. By adhering the cells at different locations on the back surface 304 of the display 104, the power storage unit 106 may provide structural support for the display 104, but also allow for greater flexibility or bendability of the display 104.

In the latter embodiment described in the preceding paragraph, the multiple cells of the power storage unit 106 may be arranged and/or connected in different configurations. More particularly, the multiple cells of the power storage unit 106 may be connected in order to sufficiently power different components of the electronic device 102. That is, a single cell may provide power to a component, or multiple cells connected either in a series or in parallel may power one or more components of the electronic device 102. For instance, provided that the power storage unit 106 includes twenty different cells, a first group of ten cells may be connected in parallel, and a second group of the other ten cells may also be connected in parallel. If additional power is required to power one or more components of the electronic device 102, the first group of ten cells and the second group of ten cells may be connected in a series so that an increased voltage is provided to the component(s) to adequately power the component(s). As a result, the multiple cells of the power storage unit 106 may be connected such that a sufficient amount of voltage is provided to adequately power different components of the electronic device 102, where some components may have greater power demands than other components.

Assume that a certain number of cells of the power storage unit 106 are adhered to the back surface 304 of the display 104. The manner in which the cells are connected may determine whether certain components of the electronic device 102 receive adequate power. For the purposes of this discussion, each cell may provide a certain amount of power (i.e., voltage) for a certain amount of time (i.e., capacity). The amount of voltage may be increased or the capacity may be increased based on how the cells are connected. When multiple cells are connected in a series, the amount of voltage associated with the multiple cells will increase, but the capacity of the multiple cells will remain the same. On the other hand, when the multiple cells are connected in parallel, the capacity of the multiple cells will increase, but the voltage will remain the same.

Accordingly, if a certain amount of voltage is required to power a particular component of the electronic device 102, as many cells as necessary may be connected in a series in order to supply the proper amount of voltage to the component. For instance, assuming that the component requires 6 volts to operate, and that a first cell of the multiple cells has 10 milliampere hours (mAh) of capacity at 3 volts, the first cell may be connected in a series with a second cell that also has 10 mAh of capacity at 3 volts. Since the first cell and the second cell are connected in a series, the voltage that the first cell and the second cell can provide is increased to 6 volts, which is sufficient to power the component. In this example, although the voltage may be increased, the capacity associated with the first cell and the second cell may remain the same (e.g., ten mAh).

On the other hand, if a certain capacity is required to power a component for a particular period of time, as many cells as necessary may be connected in parallel to meet the capacity demands of the component. For instance, using the example above, if the first cell and the second cell are connected in parallel, the capacity of the first cell and the second cell may be increased to 20 mAh (e.g., 10 mAh capacity of the first cell plus 10 mAh capacity of the second cell). Although the capacity may be increased, the voltage associated with the first cell and the second cell may remain the same (e.g., three volts).

Figure 4:
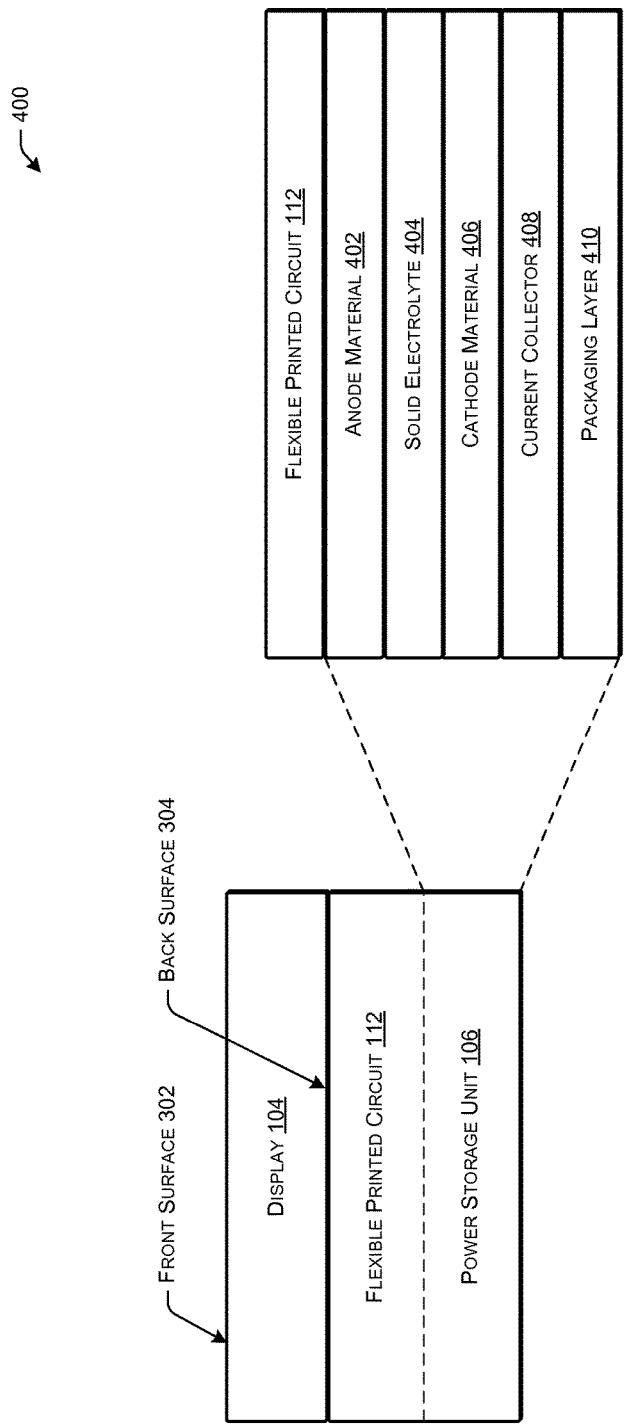
FIG. 4 illustrates an example configuration of a power storage unit that is part of a flexible printed circuit of an electronic device.

FIG. 4 illustrates a diagram 400 that corresponds to the electronic device 102 configuration illustrated in FIG. 1b. As shown, the electronic device 102 may include a display 104, which includes a front surface 302 and a back surface 304, a power storage unit 106 and flexible printed circuit (FPC) 112. The display 104 of the electronic device 102 may have an FPC 112 to connect to the main logic board (MLB) of the electronic device 102.

As shown, the power storage unit 106 may be built on, or added to, the FPC 112. In other embodiments, the FPC 112 may incorporate the FPC 112. More particularly, the power storage unit 106 may include anode material 402, a solid electrolyte 404, cathode material 406, a current collector 408, and a packaging layer 410. In certain embodiments, the FPC 112 may include a copper layer that may serve as the anode material 402. Although not shown, in certain embodiments, the power storage unit 106 may optionally include an electrical contact and an insulator. The electrical contact may provide for communications and/or the transfer of electrical current between the FPC 112 and the power storage unit 106. The insulator may serves as a barrier or insulator between the electrical contact and the remaining portions of the power storage unit 106, as described above.

Regardless, the power storage unit 106 may be built directly on, or incorporated within, the FPC 112. Therefore, the FPC 112 may be extended to not only accommodate a connection between the display 104 and the MLB, but to also accommodate the power storage unit 106. The resulting FPC 112/power storage unit 106 structure may be encapsulated or protected by the packaging layer 410, which may include a self-adhesion layer, glass, a parylene, a polymer coating, an epoxy, a laminate coating, or any other material that protects the surfaces of the FPC/power storage unit structure.

Therefore, instead of the electronic device 102 including the FPC 112 and a separate power storage unit 106, the FPC 112 and the power storage unit 106 may be combined to generate a single FPC/power storage unit structure. As discussed elsewhere herein, the FPC/power storage unit structure may also be associated with a self-healing layer 110 that may prevent or inhibit cracking or puncture of the FPC/power storage unit structure.

Figure 5:
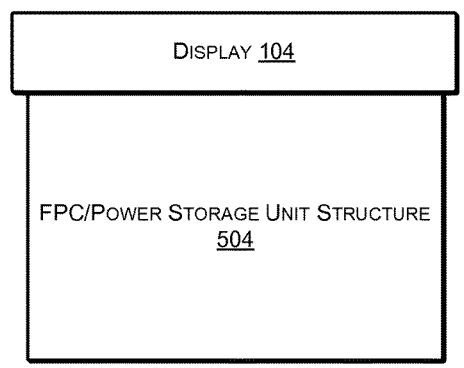
FIG. 5 illustrates an example configuration of a power storage unit that is part of a flexible printed circuit of an electronic device and that is folded onto the back surface of a display of the electronic device.
Figure 5:
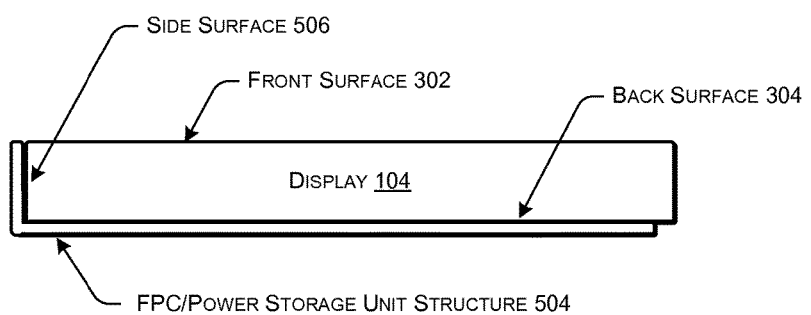

FIG. 5 illustrates diagrams 500 and 502 of the electronic device 102 configuration illustrated in FIG. 4. As described with respect to FIG. 4, the power storage unit 106 may be built onto, or incorporated within, the FPC 112 of the electronic device 102, resulting in an FPC/power storage unit structure 504, which is illustrated in diagram 500 of FIG. 5. Diagram 502 illustrates a configuration of the FPC/power storage unit structure 504 with respect to the electronic device 102.

In order to accommodate for an elongated or enlarged FPC 112 (e.g., the FPC 112 plus the power storage unit 106), the FPC/power storage unit structure 504 may be folded underneath the display 104, and possibly affixed to the back surface 304 of the display 104. The FPC/power storage unit structure 504 may be adhered or affixed to the back surface 304 of the display 104 in any manner, such as by using a PSA or other types of adhesives. In some embodiments, the FPC/power storage unit structure 504 may be folded around a side surface 506 of the display 104, and then folded along the back surface 304 of the display 104, thus forming an "L" shape. Such an orientation of the power storage unit 106 may be possible by using a lithium ceramic battery, which is a bendable and flexible lithium battery. As a result of the FPC/power storage unit structure 504 being bent or folded around the display 104, and/or due to the electronic device 102 not including a separate FPC 112 and a separate power storage unit 106, the overall thickness or depth of the electronic device 102 may be significantly decreased.

Figure 6:
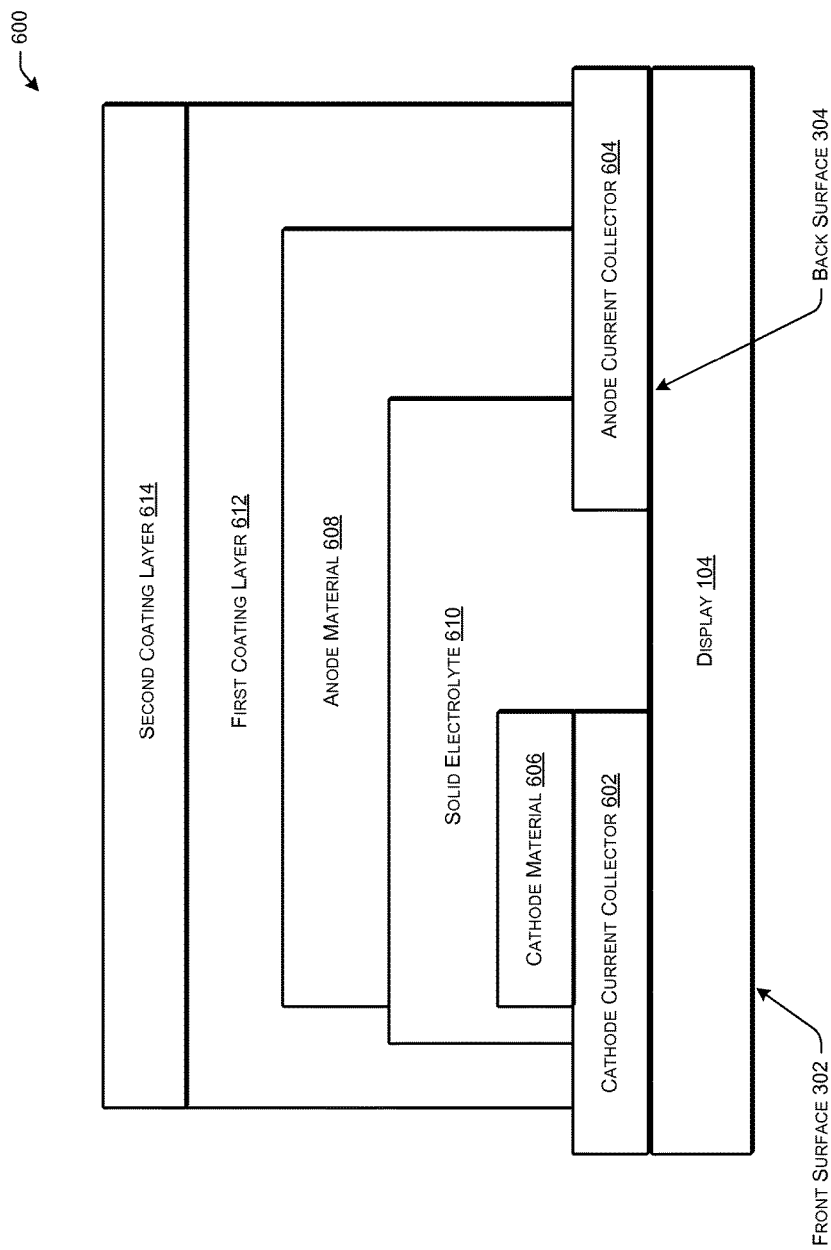
FIG. 6 illustrates an example configuration of a power storage unit that is built on a back surface of a display of an electronic device.

FIG. 6 illustrates a diagram 600 that corresponds to the electronic device 102 configuration illustrated in FIG. 1c. The diagram 600 illustrates the power storage unit 106 of the electronic device 102 being built on the back surface 304 of the display 104. More particularly, the power storage unit 106 may be built directly on a glass or silicon substrate associated with the display 104. The multiple layers/components of the power storage unit 106 may be individually deposited onto the substrate, where the multiple different layers will form the power storage unit 106.

As shown in FIG. 6, the power storage unit 106 may include a cathode current collector 602 and an anode current collector 604 that are associated with cathode material 606 and anode material 608, respectively. The cathode current collector 602 and the anode current collector 604 may be one of multiple types of metal (e.g., copper, nickel, platinum, etc.) and may be arranged in a layer or sheet. An electrolyte layer, such as a solid electrolyte 610, may be positioned between the cathode material 606 and the anode material 608. The power storage unit 106 may also include one or more coating layers, such as a first coating layer 612 and/or a second coating layer 614. In certain embodiments, the power storage unit 106 may be built on a substrate that is associated with the back surface 304 of the display 104, such as a glass substrate or a silicon substrate.

The first coating layer 612 may serve as an intermediary layer that encapsulates the power storage unit 106 and may protect the power storage unit 106 from damage or other materials (e.g., moisture, air, dust, etc.). The first coating layer 612 may include glass, parylene, or some other material to encapsulate or package the power storage unit 106. Moreover, provided that the power storage unit 106 includes lithium metal (e.g., a lithium-ion battery), the first coating layer 612 may be a type of material that is compatible with lithium metal, including one or more of the materials described above. Moreover, the second coating layer 614 may be a more robust coating or layer that further protects the power storage unit 106 from damage, where the more robust coating/layer could include an epoxy layer or a laminate layer. As mentioned previously, the first coating layer 612 and/or the second coating layer 614 may be hermetic in nature, which may cause the power storage unit 106 to be impervious to liquids and/or gases. If the power storage unit 106 includes lithium metal, the second coating layer need not be compatible with lithium metal, since the first coating layer 612 encapsulates the power storage unit 106. In certain embodiments, the electronic device 102 may include either the first coating layer 612 or the second coating layer 614, or both.

Moreover, and as discussed elsewhere herein, the power storage unit 106 structure may also be associated with a self-healing layer 110 that may prevent or inhibit cracking or puncture of the power storage unit 106 structure. Regardless of whether the self-healing layer 110 is present, building or incorporating the power storage unit 106 directly on the back surface 304 of the display 104 may significantly reduce the thickness or depth of the electronic device 102.

Figure 7:
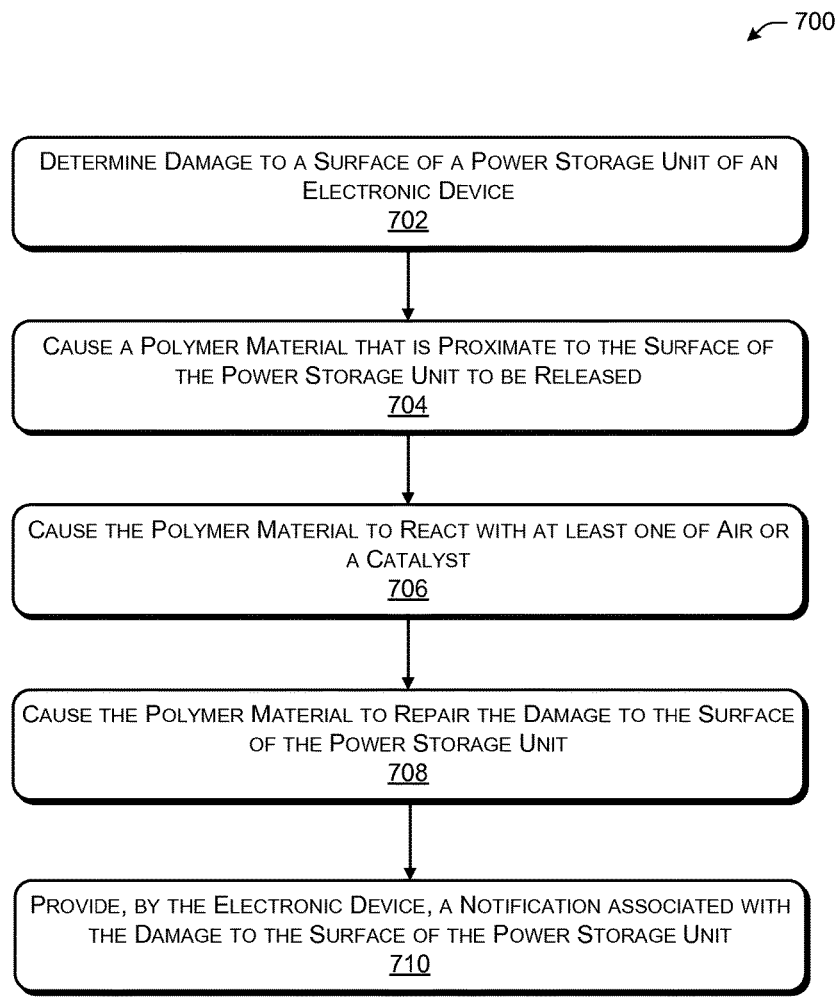
FIG. 7 illustrates an example process for determining damage to a surface of a power storage unit and a polymer material preventing further damage to the power storage unit.

FIG. 7 illustrates an example process of determining damage to a surface of a power storage unit of an electronic device and causing a polymer material to repair the damage. This process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Moreover, the following actions described with respect to FIG. 7 may be performed by the electronic device 102, as illustrated with respect to FIGS. 1-6.

Block 702 illustrates determining damage to a surface of a power storage unit of an electronic device. In some embodiments, the damage to the surface (or housing) of the power storage unit 106 may include a void, a crack, a scratch, a puncture, etc., that could potentially cause materials within the power storage unit 106 to leak. The electronic device 102 may determine or identify the damage based on a determination that an output voltage associated with the power storage unit 106 is below a threshold value, or if the output voltage is outside a predetermined range of voltage values. In other embodiments, the damage may be identified by determining that an impedance value associated with the power storage unit 106 is outside a predetermined range of impedance values. The damage to the surface of the power storage unit 106 may be due to several different reasons, such as the electronic device 102 being dropped, the output voltage of the power storage unit falling below a threshold voltage value, moisture ingress (e.g., water or some other liquid entering the electronic device 102), swelling of the power storage unit 106, and so on.

Block 704 illustrates causing a polymer material that is proximate to the surface of the power storage unit to be released. In some embodiments, although the polymer material may be included within the surface of the power storage unit 106, the polymer material may be contained within one or more capsules, channels, capillaries, reservoirs, etc., that are disposed adjacent to one or more surfaces of the power storage unit 106. Upon one or more of the capsules rupturing, the polymer material may be released. In some embodiments, the released polymer material may repair the damage to the surface of the power storage unit 106, such as by filling or sealing a crack, puncture, etc., in the surface of the power storage unit 106. The polymer material may also prevent further damage to the power storage unit 106, such as by preventing a crack from propagating along the surface of the power storage unit 106, or by preventing a puncture from penetrating deeper into the power storage unit 106.

Block 706 illustrates causing the polymer material to react with at least one of air or a catalyst. In certain embodiments, the released polymer material may be exposed to certain stimuli, such as air (e.g., oxygen), moisture, or a catalyst, which may cause the polymer material to undergo a chemical reaction. For instance, the polymer material may initially be in a solid state, and may transition to a liquid state upon being exposed to the stimuli.

Block 708 illustrates causing the polymer material to repair the damage to the surface of the power storage unit. Regardless of whether the polymer material is activated by some type of stimuli, and as stated above, the released polymer material may repair the damage to the surface of the power storage unit 106, and may possibly prevent further damage to the surface of the power storage unit 106. For instance, the released polymer material may fill or seal a crack, void, puncture, etc., in the surface of the power storage unit 106.

Block 710 illustrates providing, by the electronic device, a notification associated with the damage to the surface of the power storage unit. In some embodiments, the electronic device 102 may provide one or more notifications in response to the surface of the power storage unit 106 becoming damaged and/or repaired. For instance, the electronic device 102 may provide a notification of the damage to a user of the electronic device 102 via the display 104, but may possibly also notify the user that the damage has been repaired. The notification to the user may also include a recommendation of how to repair or replace the power storage unit 106, or a recommendation that the user should contact the manufacturer, distributor, and/or seller of the electronic device 102 for examination, repair, or replacement. The electronic device 102 may transmit similar notifications to the manufacturer, distributor, and/or seller of the electronic device 102.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An electronic book (eBook) reader device, comprising:
a housing;
memory;
one or more processors;
an electronic paper display having a front surface that displays a content item and an opposing back surface located within the housing;
a rechargeable battery adhered to the back surface of the electronic paper display using a pressure-sensitive adhesive (PSA), the rechargeable battery providing structural support for the electronic paper display and allowing for at least some flex of the electronic paper display; and
a self-healing layer that includes a polymer material, a portion of the polymer material being encapsulated within each of multiple capsules, wherein a first portion of the polymer material fills a crack or a puncture in a surface of the rechargeable battery upon (1) a first capsule, from the multiple capsules, rupturing and (2) based at least partly on a determination that an area of the surface of the rechargeable battery has increased by a threshold amount.

2. The eBook reader device as recited in claim 1, wherein the eBook reader device is configured to determine a likelihood of the crack or the puncture in the surface of the rechargeable battery by one of:
determining that an output voltage value associated with the rechargeable battery is below a pre-determined voltage threshold; or
determining that an impedance value associated with the rechargeable battery is outside a pre-determined range of impedance values.

3. The eBook reader device as recited in claim 1, wherein the polymer material is in a solid state within the multiple capsules and undergoes a chemical reaction upon the multiple capsules rupturing and the polymer material being exposed to at least one of oxygen, moisture, a temperature value above a temperature threshold, light, or a catalyst, the chemical reaction causing the polymer material to transition from the solid state into a liquid state.

4. The electronic device as recited in claim 1, wherein the determination that the area of the surface of the rechargeable battery has increased by the threshold amount includes determining that the surface of the rechargeable battery has stretched or swelled beyond the threshold amount.

5. An electronic device, comprising:
a housing;
memory;
one or more processors;
a display having a front surface and an opposing back surface within the housing;
one or more capsules that encapsulate a polymer material; and
a power storage unit that is adhered to the back surface of the display, the power storage unit providing structural support for the display,
wherein the electronic device is configured to cause at least a portion of the polymer material to fill at least one of a void, a crack, or a puncture in a surface of the power storage unit
based at least partly on (1) a first capsule, of the one or more capsules, that encapsulates the at least the portion of the polymer material rupturing and (2) a determination that an area of the surface of the power storage unit has increased by a threshold amount.

6. The electronic device as recited in claim 5, wherein the polymer material is disposed on the surface of the power storage unit to repair the at least one of the void, the crack, or the puncture in the surface of the power storage unit upon detection of one or more of a moisture value being greater than a moisture threshold or an impact causing the at least one of, the void, the crack, or the puncture in the surface of the power storage unit.

7. The electronic device as recited in claim 6, wherein the one or more capsules are included in a self-healing layer that is disposed adjacent to the surface of the power storage unit, wherein the one or more capsules are configured to rupture upon impact with another object within the electronic device.

8. The electronic device as recited in claim 6, wherein the polymer material is in a solid state and undergoes a chemical reaction upon the polymer material being exposed to at least one of oxygen, moisture, light, or a catalyst, the chemical reaction causing the polymer material to transition from the solid state to a liquid state.

9. The electronic device as recited in claim 5, wherein the electronic device is configured to determine the at least one of the void, the crack, or the puncture in the surface of the power storage unit by determining that the area of the surface of the power storage unit has at least one of stretched or swelled beyond the threshold amount.

10. The electronic device as recited in claim 9, wherein the one or more capsules are included in a self-healing layer that is disposed adjacent to the surface of the power storage unit, and wherein the electronic device is configured to cause the one or more capsules to rupture based at least partly on determining that the area of the surface of the power storage unit has at least one of stretched or swelled beyond the threshold amount.

11. An electronic device, comprising:
a housing;
memory;
one or more processors;
a display having a front surface and an opposing back surface within the housing;
a power storage unit that is adhered to the back surface of the display, the power storage unit providing structural support for the display;
one or more capsules that encapsulate a polymer material,
wherein the electronic device is configured to:
determine at least one of a void, a crack, or a puncture in a surface of the power storage unit by determining that a size of the power storage unit has stretched or swelled beyond a threshold amount; and
cause at least a portion of the polymer material to repair the at least one of the void, the crack, or the puncture in the surface of the power storage unit based at least partly on a capsule, of the one or more capsules, that encapsulates the at least the portion of the polymer material rupturing.

12. The electronic device as recited in claim 11, wherein the polymer material is disposed on the surface of the power storage unit to repair the at least one of the void, the crack, or the puncture in the surface of the power storage unit upon detection of a moisture value being greater than a moisture threshold.

13. The electronic device as recited in claim 12, wherein the one or more capsules that are included in a self-healing layer that is disposed adjacent to the surface of the power storage unit, wherein the one or more capsules are configured to rupture upon impact with another object within the electronic device.

14. The electronic device as recited in claim 12, wherein the polymer material is in a solid state and undergoes a chemical reaction upon the polymer material being exposed to at least one of oxygen, moisture, light, or a catalyst, the chemical reaction causing the polymer material to transition from the solid state to a liquid state.

15. The electronic device as recited in claim 11, wherein the one or more capsules that are included in a self-healing layer that is disposed adjacent to the surface of the power storage unit.

16. The electronic device as recited in claim 15, wherein the electronic device is configured to cause the one or more capsules to rupture based at least partly on determining that the size of the power storage unit has at least one of stretched or swelled beyond the threshold amount.

17. The electronic device as recited in claim 11, wherein the electronic device is configured to determine the at least one of the void, the crack, or the puncture in the surface of the power storage unit by determining that an output voltage value associated with the power storage unit is below a pre-determined voltage threshold.

18. The electronic device as recited in claim 11, wherein the electronic device is configured to determine the at least one of the void, the crack, or the puncture in the surface of the power storage unit by determining that an impedance value associated with the power storage unit is outside a pre-determined range of impedance values.

19. The electronic device as recited in claim 11, wherein the polymer material is disposed on the surface of the power storage unit to repair the at least one of the void, the crack, or the puncture in the surface of the power storage unit upon detection of an impact causing the at least one of the void, the crack, or the puncture in the surface of the power storage unit.

20. The electronic device as recited in claim 5, wherein the electronic device is configured to determine the at least one of the void, the crack, or the puncture in the surface of the power storage unit by at least one of:
   determining that an output voltage value associated with the power storage unit is below a pre-determined voltage threshold; or
   determining that an impedance value associated with the power storage unit is outside a pre-determined range of impedance values.

* * * * *